(12) United States Patent
Choi et al.

(10) Patent No.: US 12,328,238 B2
(45) Date of Patent: Jun. 10, 2025

(54) CONSOLIDATED INDICATORS FOR DATA COMMUNICATIONS

(71) Applicant: TSX INC., Toronto (CA)

(72) Inventors: Emily Choi, Toronto (CA); Abe Chan, North York (CA)

(73) Assignee: TSX INC., Toronto (CA)

( * ) Notice: Subject to any disclaimer, the term of this patent is extended or adjusted under 35 U.S.C. 154(b) by 0 days.

(21) Appl. No.: 18/846,611

(22) PCT Filed: Mar. 14, 2022

(86) PCT No.: PCT/IB2022/052291
§ 371 (c)(1),
(2) Date: Sep. 12, 2024

(87) PCT Pub. No.: WO2023/175370
PCT Pub. Date: Sep. 21, 2023

(65) Prior Publication Data
US 2025/0106122 A1    Mar. 27, 2025

(51) Int. Cl.
*H04L 41/5009* (2022.01)
*G06Q 40/04* (2012.01)
*H04L 47/80* (2022.01)

(52) U.S. Cl.
CPC ........ *H04L 41/5016* (2013.01); *H04L 47/808* (2013.01); *G06Q 40/04* (2013.01)

(58) Field of Classification Search
CPC .... H04L 41/5016; H04L 47/808; G06Q 40/04
See application file for complete search history.

(56) References Cited

U.S. PATENT DOCUMENTS

| | | |
|---|---|---|
| 5,101,353 A | 3/1992 | Lupien et al. |
| 7,418,417 B2 | 8/2008 | Chacko et al. |
| 7,752,116 B2 | 7/2010 | Ascher et al. |
| 7,752,121 B2 | 7/2010 | Olsson et al. |
| 7,870,060 B2 | 1/2011 | Barker et al. |
| 8,346,647 B1 | 1/2013 | Phelps et al. |
| 8,396,778 B2 | 3/2013 | Chacko et al. |
| 8,429,057 B1 | 4/2013 | Dale |
| 8,756,146 B2 | 6/2014 | Studnitzer et al. |

(Continued)

FOREIGN PATENT DOCUMENTS

| | | |
|---|---|---|
| CA | 2961770 A1 | 3/2016 |
| WO | WO-2006103474 A2 | 10/2006 |

(Continued)

*Primary Examiner* — Richard G Keehn
(74) *Attorney, Agent, or Firm* — Perry + Currier Inc.

(57) ABSTRACT

Data includes key-value pairs that include numerical keys and numerical values. Each key represents a level of service associated with a data source and client terminals. The respective value represents availability or demand for the level of service. Data from different data sources is consolidated into consolidated data by summing values for each key. A consolidated indicator is determined for the consolidated data by computing an average key and an aggregate duration of keys of the consolidated data. The consolidated indicator is outputted for access to the client terminals via a wide-area computer network to allow the client terminals to use the consolidated indicator to configure respective data communications with different data sources.

18 Claims, 9 Drawing Sheets

(56) References Cited

U.S. PATENT DOCUMENTS

| | | |
|---|---|---|
| 8,762,249 B2 | 6/2014 | Taylor et al. |
| 8,781,947 B2 | 7/2014 | Duquette |
| 10,535,092 B2 | 1/2020 | Noviello et al. |
| 2004/0010592 A1* | 1/2004 | Carver .................. H04L 47/805 709/226 |
| 2006/0173771 A1 | 8/2006 | Johnston |
| 2006/0253377 A1 | 11/2006 | Burns et al. |
| 2007/0011281 A1* | 1/2007 | Jhoney .................. G06Q 10/10 709/220 |
| 2011/0246550 A1* | 10/2011 | Levari .................. G06F 16/244 709/201 |
| 2011/0252143 A1 | 10/2011 | Baumback et al. |
| 2013/0024344 A1 | 1/2013 | Boberski et al. |
| 2014/0244472 A1 | 8/2014 | Bauerschmidt et al. |
| 2015/0149631 A1 | 5/2015 | Lissack |
| 2017/0331774 A1 | 11/2017 | Peck-Walden et al. |
| 2020/0226546 A1* | 7/2020 | Deshpande ........ G06Q 10/0875 |
| 2022/0035714 A1* | 2/2022 | Schultz ............... G06F 11/1438 |

FOREIGN PATENT DOCUMENTS

| | | | |
|---|---|---|---|
| WO | WO-2016044608 A1 * | 3/2016 | ............. G06Q 40/04 |
| WO | PCT/IB2022/052291 | 3/2022 | |

* cited by examiner

CONSOLIDATED INDICATORS FOR DATA COMMUNICATIONS

BACKGROUND

Computer systems often operate on large quantities of data. It is often the case that a system has multiple data sources that include different states for the same type or collection of data. Allowing terminals to efficiently communicate with such data sources is important to maintaining the integrity and effectiveness of large systems.

SUMMARY

According to an aspect of the present disclosure, a method includes establishing data connections to a plurality of different data sources via a wide-area computer network. The plurality of different data sources serves a plurality of client terminals via the wide-area computer network. The method further includes requesting respective data from each of the plurality of different data sources via the wide-area computer network. The respective data includes key-value pairs that include numerical keys and numerical values. Each key represents a level of service associated with a data source and the plurality of client terminals and the respective value represents availability or demand for the level of service. The method further includes receiving the respective data from each of the plurality of different data sources via the wide-area computer network, consolidating the respective data into consolidated data by summing values for each key, determining a consolidated indicator for the consolidated data by computing an average key and an aggregate duration of keys of the consolidated data, and outputting the consolidated indicator for access to the plurality of client terminals via the wide-area computer network to allow the plurality of client terminals to use the consolidated indicator to configure respective data communications with the plurality of different data sources.

Determining the consolidated indicator for the consolidated data may include computing the average key as weighted by the values.

The method may further include determining the consolidated indicator from a spread between availability and demand by computing for key-value pairs that represent the availability of the service an average of respective keys as weighed by respective values to obtain an average availability key, computing for key-value pairs that represent the demand of the service an average of respective keys as weighed by respective values to obtain an average demand key, and determining the spread as a difference between the average availability key and the average demand key.

The method may further include limiting an amount of key-value pairs that represent the availability of the service, and limiting by the same amount, key-value pairs that represent the demand of the service.

The method may further include computing the aggregate duration as a portion of time during which a range of keys is present in the consolidated data.

The method may further include computing different aggregate durations for different ranges of keys and combining the different aggregate durations to obtain the consolidated indicator.

Determining the consolidated indicator for the consolidated data may include computing the average key as weighted by the values and computing the aggregate duration as a portion of time during which a range of keys is present in the consolidated data, and combining the average and the aggregate duration to obtain the consolidated indicator.

Combining the average key and the aggregate duration may include normalizing and averaging the average key and the aggregate duration.

Each key may be a price level of a financial instrument and each value may be a volume of the financial instrument to be traded at a respective price level.

According to another aspect of the present disclosure a device includes a network interface and a processor connected to the network interface. The network interface is configured to provide data connections to a plurality of different data sources via a wide-area computer network. The plurality of different data sources serves a plurality of client terminals via the wide-area computer network. The processor is configured to request respective data from each of the plurality of different data sources via the wide-area computer network. The respective data includes key-value pairs that include numerical keys and numerical values. Each key represents a level of service associated with a data source and the plurality of client terminals and the respective value represents availability or demand for the level of service. The processor is further configured to receive the respective data from each of the plurality of different data sources via the wide-area computer network, consolidate the respective data into consolidated data by summing values for each key, determine a consolidated indicator for the consolidated data by computing an average key and an aggregate duration of keys of the consolidated data, and output the consolidated indicator for access to the plurality of client terminals via the wide-area computer network to allow the plurality of client terminals to use the consolidated indicator to configure respective data communications with the plurality of different data sources.

The processor may be configured to determine the consolidated indicator for the consolidated data by computing the average key as weighted by the values.

The processor may be configured to determine the consolidated indicator from a spread between availability and demand by computing for key-value pairs that represent the availability of the service an average of respective keys as weighed by respective values to obtain an average availability key, computing for key-value pairs that represent the demand of the service an average of respective keys as weighed by respective values to obtain an average demand key, and determining the spread as a difference between the average availability key and the average demand key.

The processor may be configured to limit an amount of key-value pairs that represent the availability of the service and limit, by the same amount, key-value pairs that represent the demand of the service.

The processor may be configured to compute the aggregate duration as a portion of time during which a range of keys is present in the consolidated data.

The processor may be configured to compute different aggregate durations for different ranges of keys and combine the different aggregate durations to obtain the consolidated indicator.

The processor may be configured to determine the consolidated indicator for the consolidated data by computing the average key as weighted by the values, computing the aggregate duration as a portion of time during which a range of keys is present in the consolidated data, and combining the average and the aggregate duration to obtain the consolidated indicator.

The processor may be configured to combine the average key and the aggregate duration by normalizing and averaging the average key and the aggregate duration.

Each key may be a price level of a financial instrument and each value may be a volume of the financial instrument to be traded at a respective price level.

DETAILED DESCRIPTION

The overall state of a large, distributed computer system may not be readily apparent to a client terminal. This may especially be the case in systems that are operated by multiple different parties, who may not always share information or cooperate. The prevailing availability or demand for a service or resource provided by the system may be difficult to ascertain with sufficient accuracy. A client terminal may therefore communicate with a data source of the system according to its predetermined operational instructions without regard to the bigger picture embodied by the system as a whole. A technical problem with this approach is that a client terminal may not utilize the data source efficiently. For example, the client terminal may add demand to a data source that already experiences a high demand for the service offered. Or, the client terminal may offer the service to a data source that already has a high amount of availability of the service. The technical solution provided herein includes computing a consolidated indicator that informs client terminals of an overall availability or demand for a service. This allows client terminals to delay demand when availability is low, delay offering availability when availability is high, and so on. In example implementations pertaining to distributed computing, a client terminal may refrain from offering its computational resources to a pool of such resources until demand is high, or a client terminal may refrain from making demands for computational resources until availability is high. In example implementations pertaining to financial transactions, consolidated indicator may represent liquidity of a financial instrument being traded. Accordingly, a client terminal may take bid for or offer positions in trades based on the consolidated indicator to increase or maximize transaction effectiveness.

Figure 1:
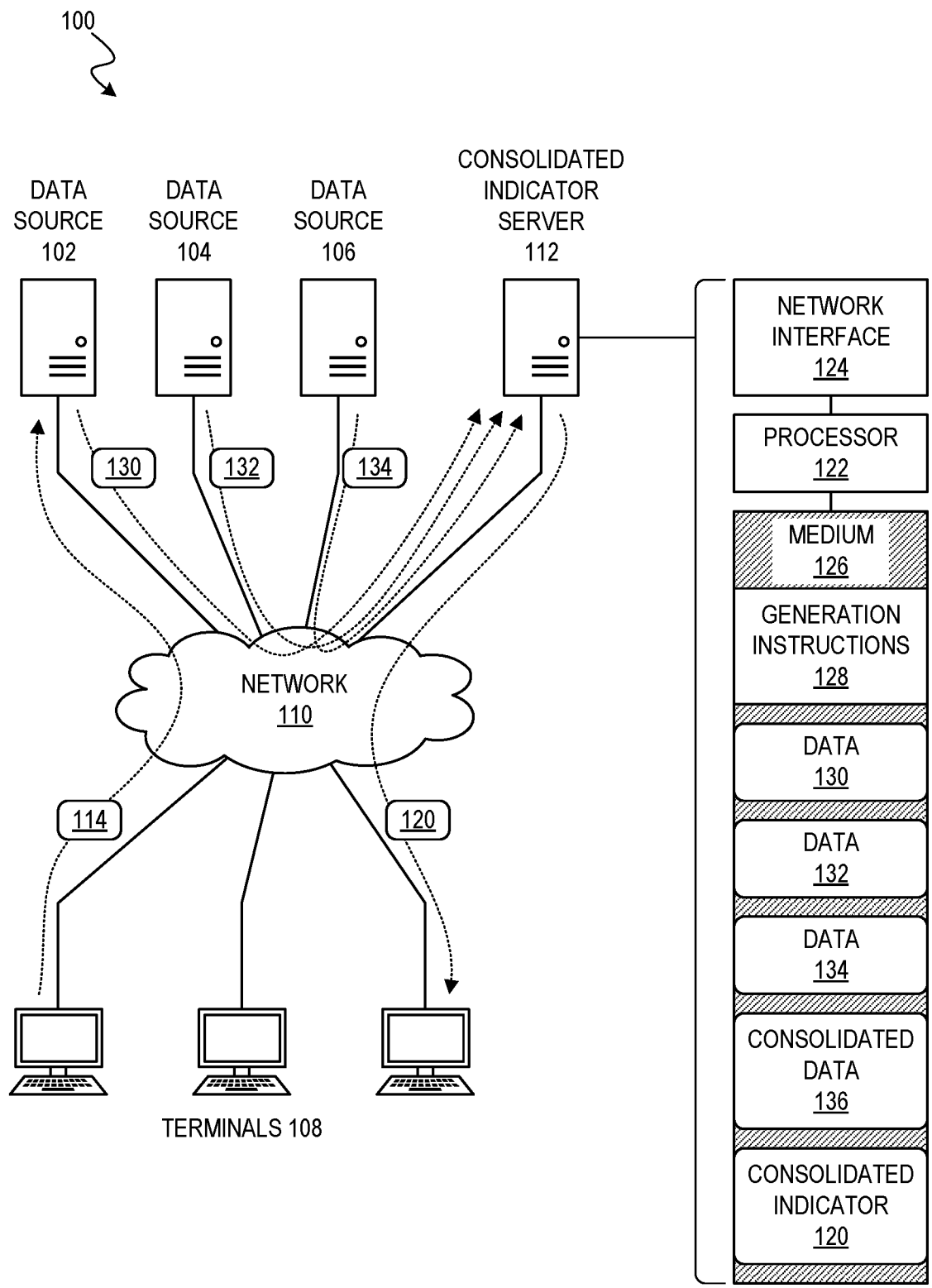
FIG. 1 is a diagram of an example system to provide a consolidated indicator to client terminals via a wide-area computer network to allow the client terminals to configure respective data communications with different data sources on which the consolidated indicator is based.

With reference to FIG. 1, a computer system 100 includes a plurality of different data sources 102, 104, 106, a plurality of client terminals 108, a computer network 110, and a consolidated indicator server 112. The data sources 102, 104, 106, client terminals 108, and consolidated indicator server 112 are connected to the computer network 110.

Each data source 102, 104, 106 includes a general-purpose or special-purpose computer with a processor and non-transitory machine-readable medium to collect, process, store, and disseminate data. Each data source 102, 104, 106 may include a group of cooperating computers that serve different purposes. For example, a first computer may collect and process data, while a second computer may summarize and publish information related to operations of the first computer. Each data source 102, 104, 106 may disseminate data indicative of a level of service associated with the data source 102, 104, 106 and an availability or demand for the level of service. Any suitable number of data sources 102, 104, 106 may be used, with three merely being an example.

A service as discussed herein may mean the coordination or provision of resources, such as allocating processing/memory in a distributed computing system, trading of financial instruments, or similar.

A data source 102, 104, 106 may provide service to a client terminal 108 and, as such, may have an availability for such service. A data source 102, 104, 106 may accept service from a client terminal 108 and, accordingly, may have demand for such service. An example of a service is the coordinating of computational resources in a distributed compute environment. A client terminal 108 may demand compute resources from a data source 102, 104, 106, which may provide such to the client terminal 108 based on availability. Conversely, a client terminal 108 may offer compute resources to a data source 102, 104, 106, which may accept such from the client terminal 108 based on demand. Another example of a service is the trading of financial instruments, such as stocks, funds, or currencies. A client terminal 108 may bid on a volume of shares at a data source 102, 104, 106, which may provide such to the client terminal 108 based on availability. Conversely, a client terminal 108 may offer a volume of shares to a data source 102, 104, 106, which may accept such from the client terminal 108 based on demand. In both of these examples, the data sources 102, 104, 106 may mediate the exchange of resources (e.g., compute power, financial instruments, etc.) among different client terminals 108 that do not communicate directly. Numerous other examples of services that may be demanded and/or provided among client terminal 108 via data sources 102, 104, 106 should also be readily apparent in light of this disclosure.

In financial examples, a data source 102, 104, 106 may be a market data source that is connected to an electronic trading/exchange system. A market data source may offer Level 2 (L2) market data. Interaction by a client terminal 108 may include obtaining market data from a data source 102, 104, 106, making a trade decision, then providing trade information to the same or different data source 102, 104, 106 to effect a trade. Each data source 102, 104, 106 may be operated by a different entity.

Each client terminal 108 may include a general-purpose or special-purpose computer with a processor and non-transitory machine-readable medium to receive input data and provide output data 114 related to data maintained by the data sources 102, 104, 106. A client terminal may provide data to a data source 102, 104, 106, obtain data from a data source 102, 104, 106, or both provide and obtain data.

The computer network 110 may include a local-area network (LAN), wide-area network (WAN), virtual private network (VPN), a mobile network, the internet, or a combination of such. The computer network 110 may be wired, wireless, or both.

The consolidated indicator server 112 is a device that includes a special-purpose computer configured to obtain data from the data sources 102, 104, 106, generate a consolidated indicator 120 based on the obtained data, and provide the consolidated indicator 120 to client terminals 108 via the wide-area computer network 110. The consolidated indicator 120 may allow the client terminals 108 to configure respective data communications with the different data sources 102, 104, 106 in an efficient or optimized way. A client terminal configuring data communications with a data source 102, 104, 106 may include communicating data or refraining from communicating data that offers or demands the service provided by the data source 102, 104, 106.

The consolidated indicator server 112 may include a processor 122, network interface 124 connected to the processor 122, and non-transitory machine-readable medium 126 connected to the processor 122.

The processor 122 may include a central processing unit (CPU), microprocessor, field programmable gate array (FPGA), or application-specific integrated circuit (ASIC) configurable by hardware, firmware, and/or software into a special-purpose computer.

The network interface 124 may include hardware, such as a network adaptor, and firmware/software, such as a driver, to facilitate data communications via the computer network 110 and specifically with the data sources 102, 104, 106 and the client terminals 108.

The non-transitory machine-readable medium 126 may include an electronic, magnetic, optical, or other type of non-volatile physical storage device that encodes instructions that implement the functionality discussed herein. Examples of such storage devices include a non-transitory computer-readable medium such as a hard drive (HD), solid-state drive (SSD), read-only memory (ROM), electrically-erasable programmable read-only memory (EEPROM), or flash memory.

The medium 126 may store indicator generation instructions 128 that are executable by the processor 122. The medium 126 may further store input data 130, 132, 134 respectively obtained from the data sources 102, 104, 106, consolidated data 136 generated from the input data 130, 132, 134, and the consolidated indicator 120 generated by the indicator generation instructions 128 from the consolidated data 136.

The indicator generation instructions 128 consolidate data 130, 132, 134 received from the data sources 102, 104, 106 to obtain consolidated data 136 and determine the consolidated indicator 120 for the consolidated data 136 by computing an average key and an aggregate duration of keys of the consolidated data 136.

The data 130, 132, 134 obtained from the different data sources 102, 104, 106 are indicative of a level of service associated with the respective data source 102, 104, 106 and an availability or demand for the level of service. The consolidated indicator 120, being computed from an average key and an aggregate duration of keys of the consolidated data 136 obtained from the data 130, 132, 134, may thus represent a collective level of service and availability or demand for the level of service of the data sources 102, 104, 106.

For example, one data source 102 may have a high availability for a level of service over several short durations of time, another data source 104 may have a long duration of low availability for the level of service, and another data source 106 may have sporadic indications of very little availability for the level of service. The consolidated indicator server 112 distills this information into a consolidated indicator 120 that may be used by the client terminals 108 when evaluating whether a desired level of service can be met by one or many of the data sources 102, 104, 106 or by other comparable data sources 102, 104, 106. Conversely, the same applies to demand for a level of service that a client terminal 108 may offer, or a combination of supply and demand for the level of service.

A client terminal 108 may use the consolidated indicator 120 to configure its communications with the data sources 102, 104, 106. This may include triggering automatic action, such as communicating data with a data source 102, 104, 106, issuing an alert to a user of the client terminal 108, changing whether the client terminal 108 is offering or demanding the service, or changing an amount of a service offered or demanded.

Figure 2:
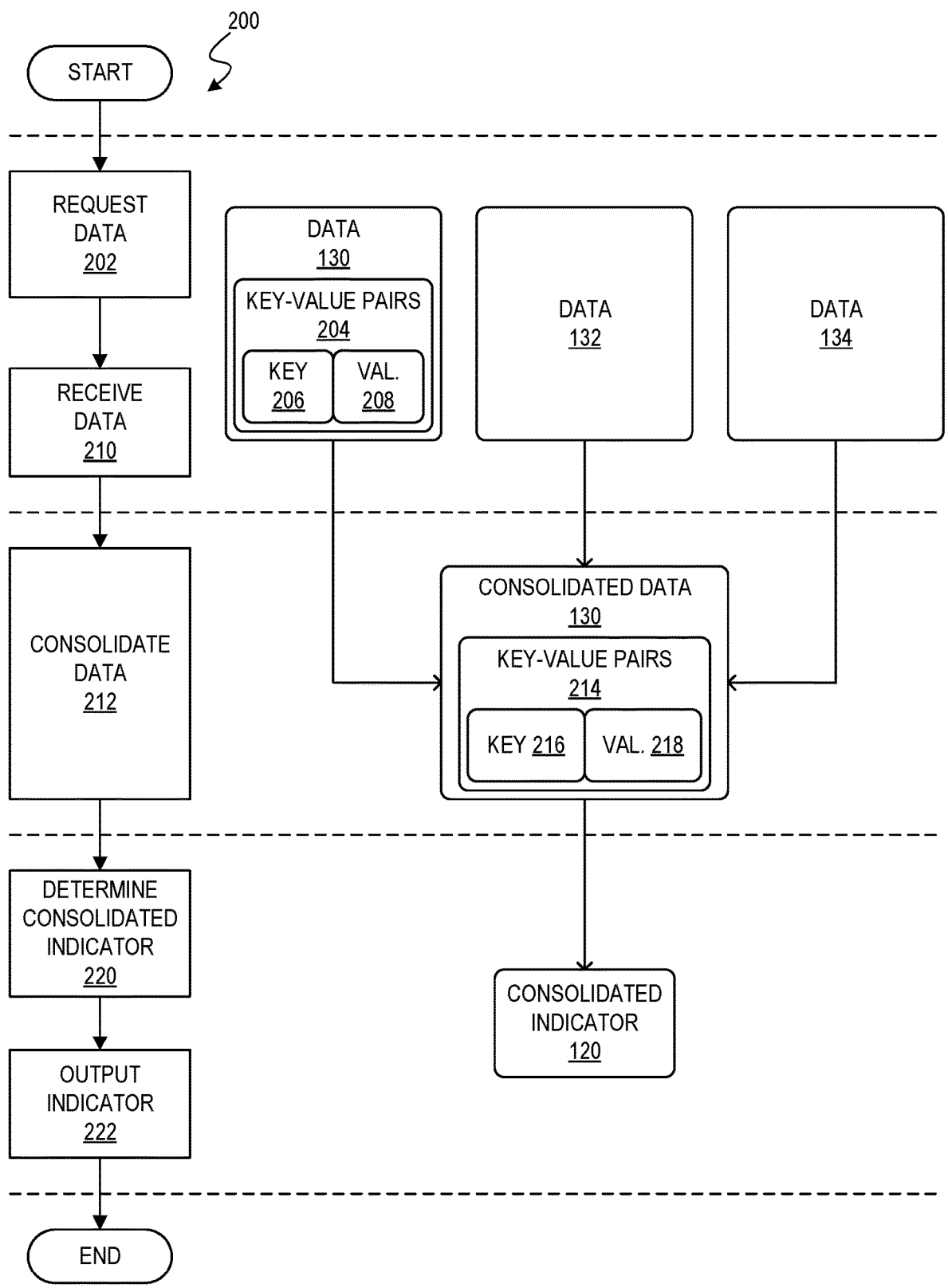
FIG. 2 is a flowchart of an example method to provide a consolidated indicator that provides for configuration for data communications with different data sources on which the consolidated indicator is based.

FIG. 2 shows an example method 200 to provide a consolidated indicator 120 that provides for configuration for data communications with different data sources on which the consolidated indicator 120 is based. The method 200 may be implemented with a server, such as the server 112 of FIG. 1, by processor-executable instructions, such as the instructions 128 of FIG. 1, and may be operable within a computer system, such as the system 100 of FIG. 1. Although the method 200 is not limited to a particular system, FIG. 1 and related description may be referenced for further discussion that is not repeated here for sake of brevity, with like terminology and reference numerals denoting like components.

At block 202, data 130, 132, 134 is requested from each of the plurality of different data sources via a wide-area computer network. Each set of data 130, 132, 134 may come from a different data source. Each set of data 130, 132, 134 includes key-value pairs 204 that include numerical keys 206 and numerical values 208. Each key 206 represents a level of service provided by the respective data source to a plurality of client terminals. Each value 208 represents availability or demand for the level of service. For example, a key of "5" may represent a level of service greater than a key of "4." A value of "100" may represent degree of availability twice that of a value of "50," whereas a value of "−100" may indicate a demand. Note that the content of data 130 is shown and the content of data 132, 134 is comparable, but omitted from the drawing for sake of clarity.

At block 210, the data 130, 132, 134 is received from each of the plurality of different data sources via the wide-area computer network.

At block 212, the received data 130, 132, 134 is consolidated into consolidated data 136 by summing values 208 for each key 206 to obtain consolidated key value-pairs 214 with consolidated keys 216 and consolidated values 218. That is, for each unique key 206 among the different sets of data 130, 132, 134, the corresponding values 208 from among the different sets of data 130, 132, 134 are summed. Consolidated key value-pairs 214 thus have a single instance of every key 206 from the data 130, 132, 134 in association with sums of values 208 from the data 130, 132, 134 for each such key 206. This will be described in further detail below.

At block 220, a consolidated indicator 120 is determined for the consolidated data 136 by computing an average key and an aggregate duration of keys of the consolidated data 136. Determining the consolidated indicator 120 may include computing an average of the keys 206 as weighted by the values 208, computing an aggregate duration of the keys 206 as a duration during which a range of keys is present in the consolidated data 136, and combining the average and the aggregate duration to obtain the consolidated indicator 120.

At block 222, the consolidated indicator 120 is outputted for access to the plurality of client terminals via the wide-area computer network to allow the plurality of client terminals to use the consolidated indicator 120 to configure respective data communications with the plurality of different data sources that originated the data 130, 132, 134. For example, if the consolidated indicator 120 indicates a general lack availability of a level of service, a client terminal may operate to reduce its demand for service or offer the service instead. Likewise, if the consolidated indicator 120 indicates a general high availability for a level of service, a client terminal may operate to increase its demand for service.

The method 200 may be repeated at intervals, such as regularly or periodically. A specific interval, whether fixed or variable, may be selected based on the use-case for the consolidated indicator 120.

Figure 3:
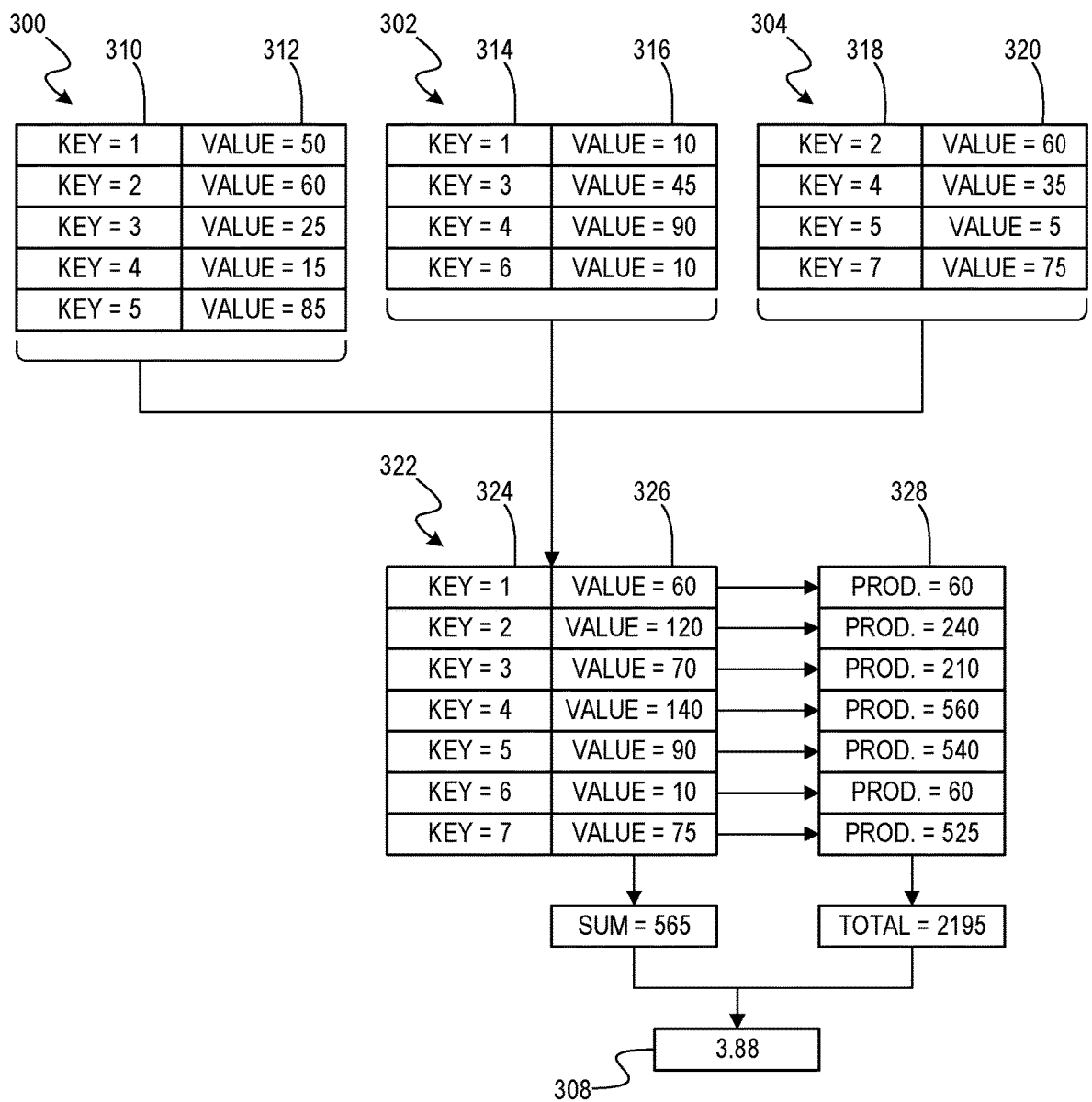
FIG. 3 is a schematic diagram of examples of data, consolidated data, and a consolidated indicator indicating an average.

FIG. 3 shows examples of data 300, 302, 304, consolidated data 306, and a consolidated indicator 308. As will be discussed, the consolidated indicator 308 indicates an average level of availability or demand for a resource described by the data 300, 302, 304.

Data 300 includes keys 310 and respective values 312. Data 302, which is from another data source, includes keys 314 and respective values 316. Data 304, which is from still another data source, includes keys 318 and respective values 320. Data 300, 302, 304 may contain different keys and values, but are consistent as to the meaning and scale of the keys and values.

Data 300, 302, 304 are consolidated by taking each unique key and summing values for the key. Consolidated data 322 thus has one instance of each key 310, 314, 318 in data 300, 302, 304 with sums of the corresponding values 312, 316, 320. For example, as shown the key "1" has values 50 and 10, which are summed to 50. Key "2" occurs in data 300 and data 304 with respective values of 50 and 60, and thus the sum for key "2" is 110. Key "4" occurs in all sets of data 300, 302, 304 and has a sum of 140 (i.e., 15+90+35). Key "7" occurs only in data 304 and thus its sum is its value of 75. Thus, keys 324 and corresponding values 326 of consolidated data 322 may be computed.

The consolidated indicator 308 may be computed from the consolidated data 322 as an average of the keys 324, as weighted by the values 326. Each key 324 may be multiplied by its value 326, and the resulting products 328 may be summed. The total may then be divided by the sum of the values 326. The result is a weighted average of the keys 324, which may be taken as the consolidated indicator 308.

In various examples, keys may represent levels of a compute resource available or in demand, such as processing capacity, storage space, available memory, average latency, etc. and values may represent respective quantities of such levels of compute resources.

The consolidated indicator 308 thus may represent an average availability or demand of the compute resource. In financial examples, keys may represent price levels and values may represent volumes of a financial instrument, such as shares of a stock, offered for sale or purchase. The consolidated indicator 308 thus may represent an average price for the instrument with consideration to available or demanded volume.

Figure 4:
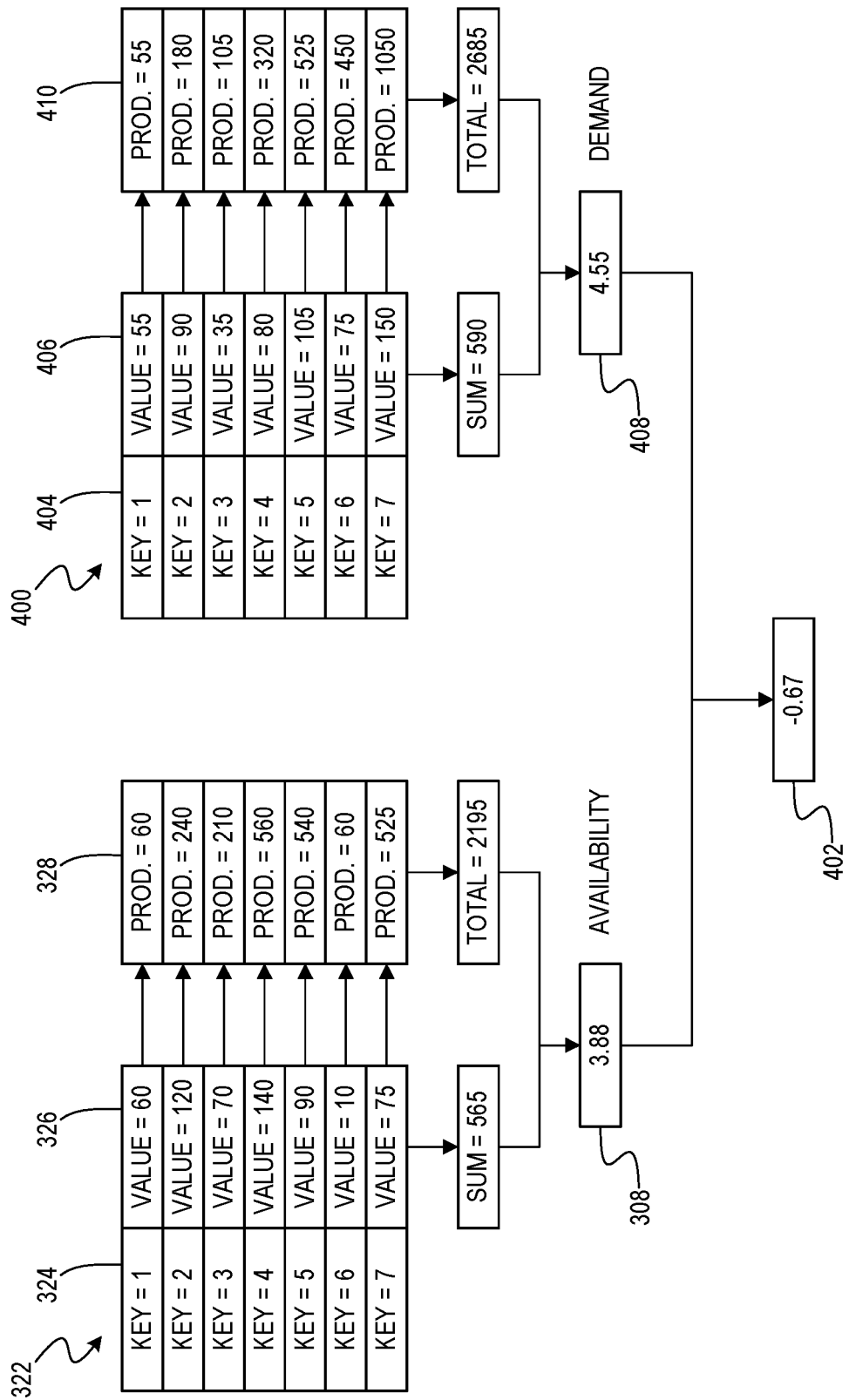
FIG. 4 is a schematic diagram of examples of consolidated data and a consolidated indicator indicating a spread.

FIG. 4 shows examples of consolidated data 322, 400 and a consolidated indicator 402 indicating a spread. As will be discussed, the consolidated indicator 402 indicates a spread or discrepancy between availability and demand for a resource described by the consolidated data 322, 400.

Keeping with the example of FIG. 3 for sake of explanation, data 300, 302, 304 may represent availability or demand for a resource, and thus consolidated data 322 may represent consolidated availability or demand for the resource. For illustrative purposes, it may be considered that data 300, 302, 304, and thus consolidated data 322, represents availability. Consolidated data 400 may be generated from underlying data (not shown) representative of demand for the resource in the same way that consolidated data 322 is generated from data 300, 302, 304. As such, consolidated data 400 may be considered to represent demand.

The consolidated data 400 may have keys 404 and values 406 with the same meaning and at the same scale as the keys 324 and values 326 of the consolidated data 322. Consolidated data 400 need not have the same instances of keys and need not have comparable values to the consolidated data 322.

The consolidated data 322 includes key-value pairs that represent the availability of the service. A weighted average of respective keys may be computed to obtain an average availability key 308, which ways taken as a consolidated indicator in the example of FIG. 3.

The consolidated data 400 includes key-value pairs that represent the demand of the service. An average of respective keys 404 as weighed by respective values 406 may be computed to obtain an average demand key 408. Just as in the example of FIG. 3, products 410 of keys 404 and respective values 406 may be totaled and divided by the sum of the values 406.

The spread may be the difference between the average availability key 308 and the average demand key 408, and the spread may be taken as the consolidated indicator 402. In various examples, the consolidated indicator 402 may thus represent a quantified disparity between availability and demand for a resource.

The amount of key-value pairs that represent the availability and demand of the service may be limited to a subset of the actual key-value pairs present in the consolidated data 322, 400, so as reduce the necessary computations, provide selective insight into the nature of the consolidated data 322, 400, and/or remove outliers. In various examples, the amount of key-value pairs are limited for both sets of consolidated data 322, 400 by the same amount.

Figure 5:
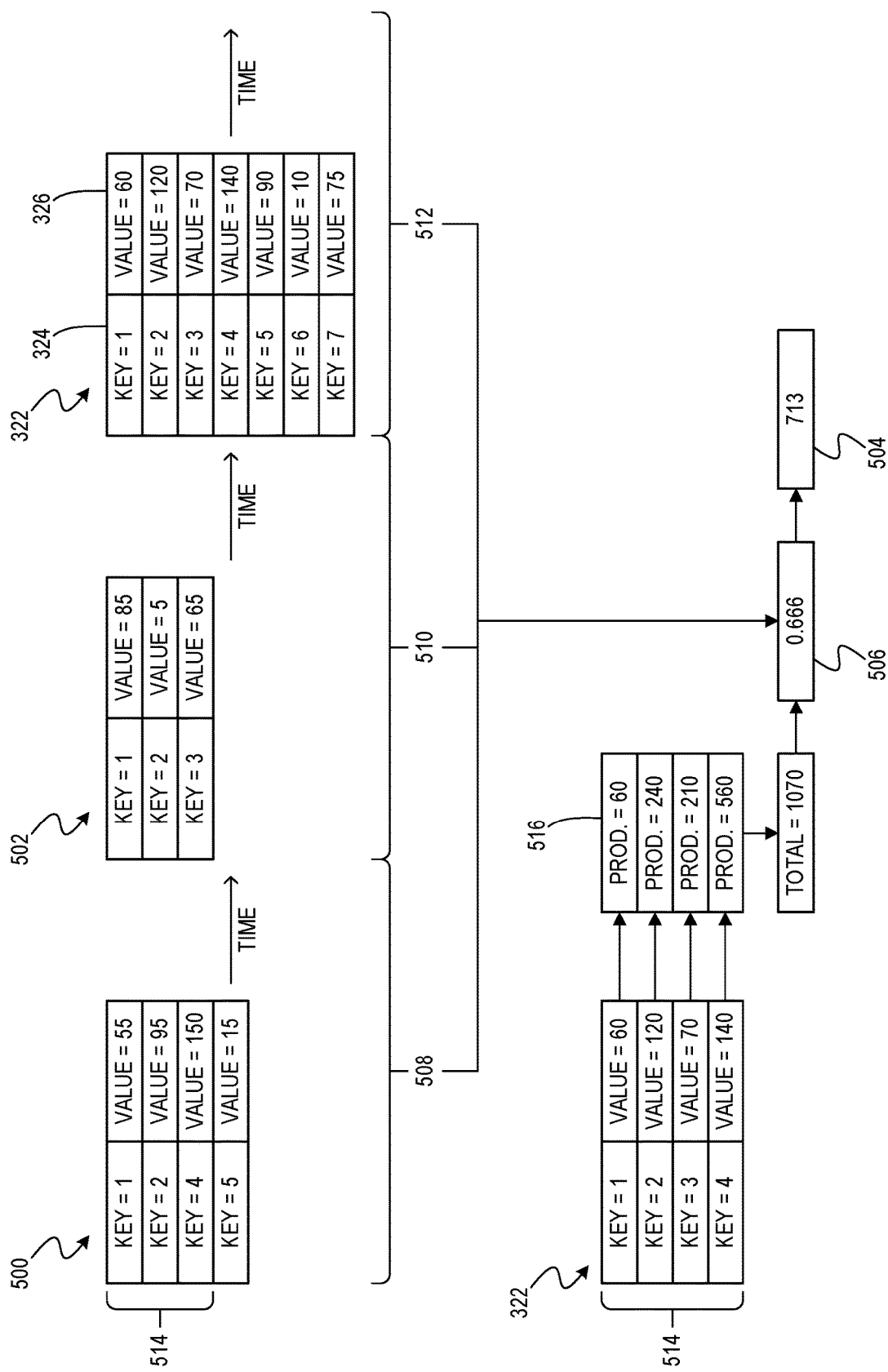
FIG. 5 is a schematic diagram of examples of consolidated data and a consolidated indicator based on an aggregate duration.

FIG. 5 shows examples of consolidated data 500, 502, 322 and a consolidated indicator 504 based on an aggregate duration 506.

Keeping with the example of FIG. 3 for sake of explanation, the consolidated data 322 may be time dependent and may be preceded by any number of instances of consolidated data 500, 502 determined from underlying data in the same was as the consolidated data 322 is determined. That is, data may change over time and may be consolidated over intervals 508, 510, 512, which may be equal or unequal. Example intervals include 10 seconds, 30 seconds, 1 minute, 2 minutes, 5 minutes, 10 minutes, 1 hour, and 1 day.

The consolidated indicator 504 may quantify this time dependence, so as to provide a more useful representation of the availability or demand for the service. Client terminals and/or their users may make decisions regarding the service over the course of time, and the consolidated indicator 504 may reduce instantaneous or spurious changes in data that might otherwise unduly influence such decisions.

The aggregate duration 506 may be computed as a portion of time during which a range 514 of keys is present in the consolidated data 500, 502, 322. The portion of time may be a ratio of time that the range 514 of keys is present in the consolidated data 500, 502, 322 compared to a total time covered by the consolidated data 500, 502, 322. For example, considering each interval 508, 510, 512, if the respective consolidated data 500, 502, 322 contains the range 514 of keys, then that interval is included in the aggregate. If not, then the interval is omitted from the aggregate.

In the example shown, the range 514 of keys is from "1" to "4." Consolidated data 500, 322 at respective intervals 508 and 512 span this range 514, but interval 510 does not. Since two-thirds of the intervals 508, 510, 512 have data that span the range 514 of keys, the aggregate duration 506 is ⅔ or 0.666.

The consolidated indicator 504 may be computed as a total of products 516 keys weighed by respective values for keys that fall within the range 514 multiplied by the aggregate duration 506. In other examples, a natural logarithm of the total of products 516 may be taken prior to multiplication by the aggregate duration 506.

The consolidated indicator 504 may thus represent the availability or demand for a service provided by various data sources, where such representation considers variance over time. The longer a key value is represented in consolidated data, then the more reliable the represented availability or demand.

The techniques discussed in FIGS. 3 to 5 may be combined. For example, the consolidated indicator 402 of FIG. 4 may be combined with the consolidated indicator 504 of FIG. 5. Indicators 402, 504 may be averaged and normalized to a standard scale.

Figure 6:
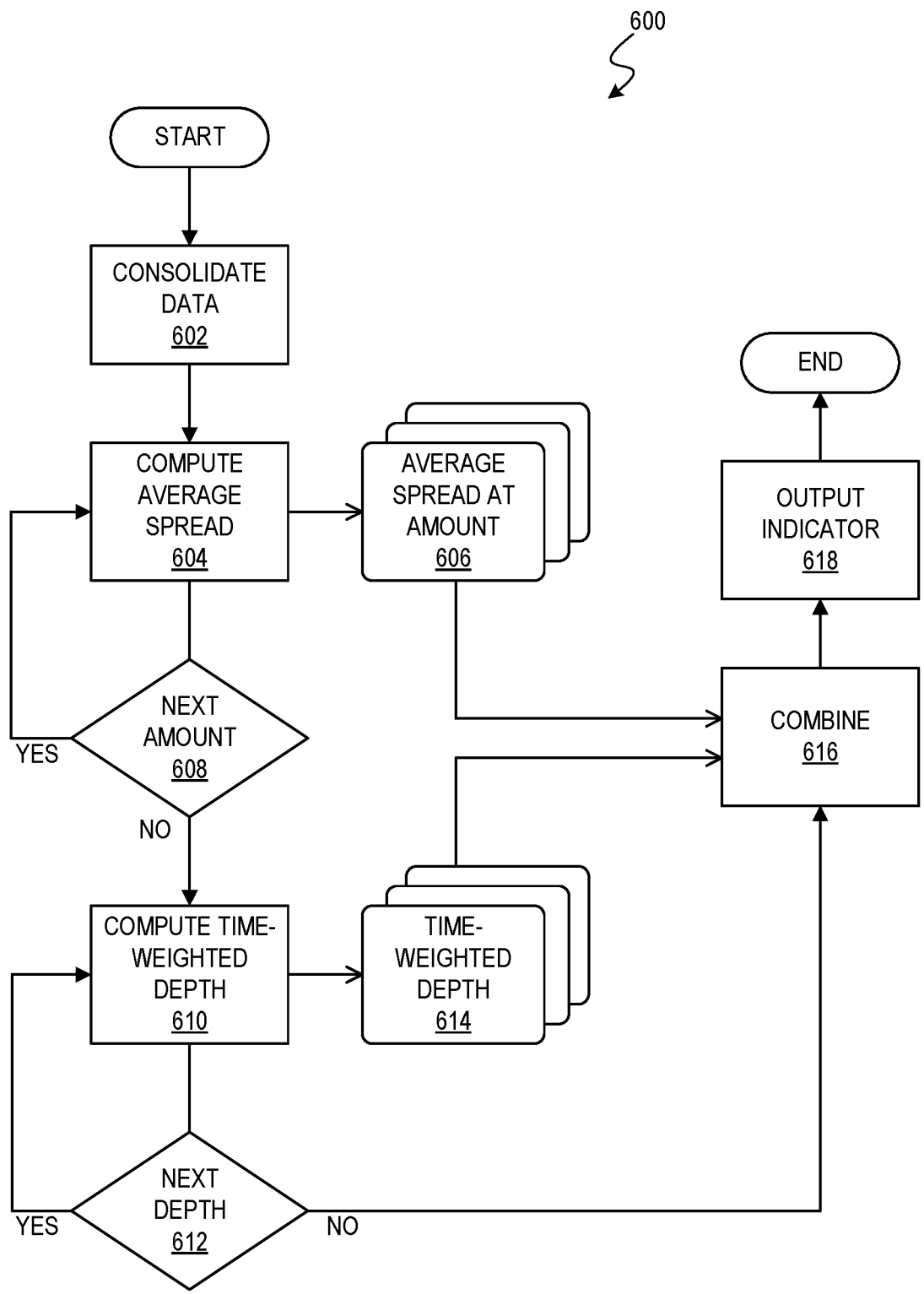
FIG. 6 is a flowchart of an example method to provide a consolidated indicator in a financial example.

FIG. 6 shows an example method 600 to provide a consolidated indicator in a financial example. The method 600 incorporates techniques discussed above. The method 600 may be implemented with a server, such as the server 112 of FIG. 1, by processor-executable instructions, such as the instructions 128 of FIG. 1, and may be operable within a computer system, such as the system 100 of FIG. 1. Although the method 600 is not limited to a particular system, FIG. 1 and related description may be referenced for further discussion that is not repeated here for sake of brevity, with like terminology and reference numerals denoting like components. In addition, FIGS. 2 to 5 and related description may be referenced for details of techniques omitted here for sake of brevity.

Figure 7A:
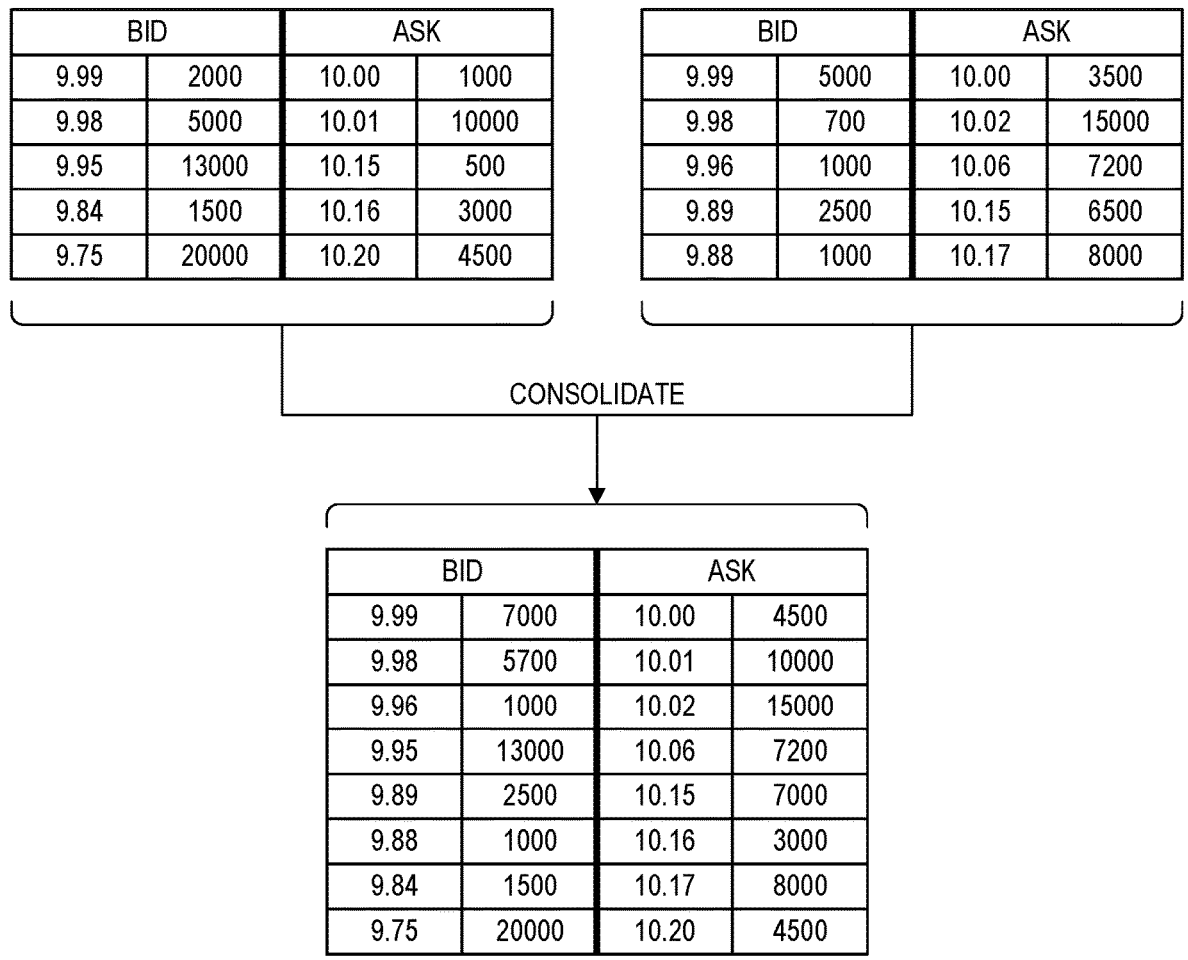
FIG. 7A is a table of an example of consolidation of data in a financial implementation of the example method of FIG. 6.

At block 602, data from various data sources is requested, received, and consolidated. Received data may include Level 2 (L2) orderbook data that includes side, price, volume, and time priority for a particular financial instrument, such as an equity or stock. Consolidation may include summing volumes at each price level, as shown in FIG. 7A. In this example, keys are price levels and values are volumes of shares.

At block 604, an average spread 606 is computed on the consolidated data for a particular monetary amount, such as $25,000 initially. An average of asks is computed as the sum of ask prices weighted by ask volumes up to the particular monetary amount divided by the sum of the same ask volumes. An average of bids is computed as the sum of bid prices weighted by bid volumes up to the particular monetary amount divided by the sum of the same bid volumes. The average spread is the average of asks less the average of bids. The average spread may be normalized by dividing by the top-of-book mid-price and may further be put into a scale, such as 1 to 5.

Via block 608, average spreads 606 are computed at block 604 for various additional monetary amounts, such as $50,000; $100,000; $200,000; $500,000; and $1,000,000. These monetary amounts may be considered limits on an amount of key-value pairs that represent the availability of the service and the demand of the service, the service being a transaction for the financial instrument. The buy and sell sides are limited by the same amount of key-value pairs (price-volume pairs) by way of the monetary amount. The computation of block 604 may be looped via block 608 for a range of particular monetary amounts.

Figure 7B:
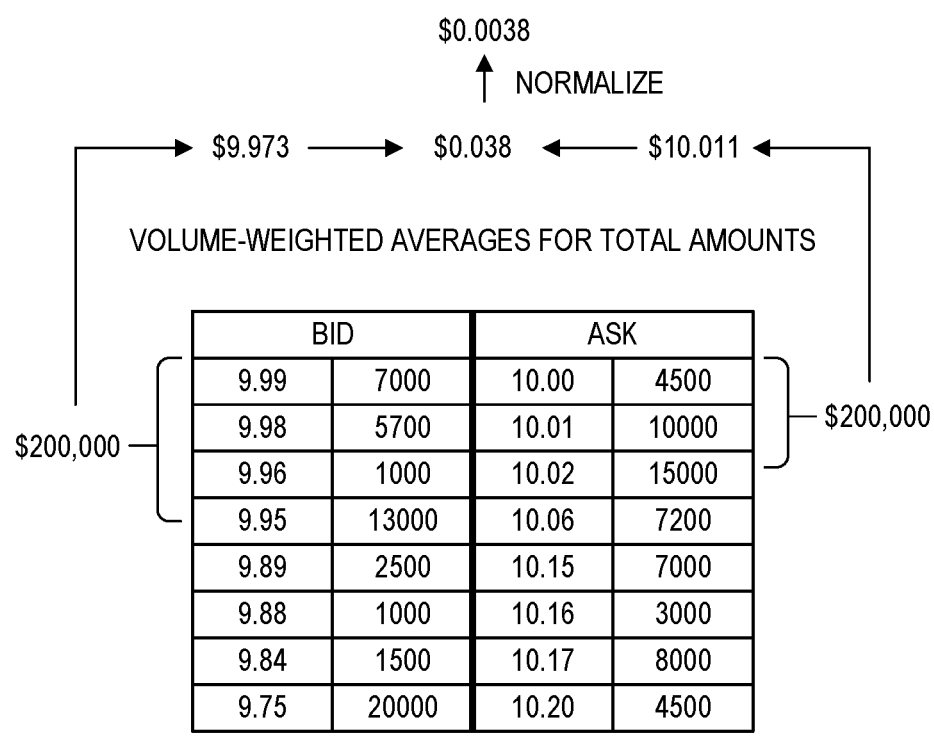
FIG. 7B is a table of an example computation of a spread in a financial implementation of the example method of FIG. 6.

FIG. 7B shows an example of this computation for an amount of $200,000. On the bid side, $200,000 of value is realized 6354 shares into the 13000-share bid at $9.95. The volume-weighted average bid is thus $9.973 ($200,000/[700+5700+1000+6354]). On the ask side, $200,000 of value is realized 5479 shares into the 15000-share offer at $10.02. The volume-weighted average ask is thus $10.011 ($200,000/[4500+10000+5479]). The average spread for $200,000 is thus $0.038 ($10.011−$9.973).

The average spread may be normalized by dividing by the top-of-book mid-price, which in this example is $9.995. The normalized average spread may thus be 0.0038. The normalized average spread may then be scaled to a range, such as 1 to 5.

Scaling, in financial examples, may include taking a z-score of the normalized average spread with respect to other financial instruments. This may be computed as follows, where v is a normalized average spread (e.g., 0.0038) for the instrument in question and N is a number (e.g., 2000) of instruments for comparison.

Step 1: Component 1 z-score $(c1)=(v-\text{average of }v$ over all N securities)/standard deviation of v over all N securities; and Step 2: Determine a scale value. When c1>min(c1) over all N securities+(max(c1) over all N securities−min(c1) over all N securities)/10*7 and c1<=min(c1) over all N securties+(max(c1) over all N securities−min(c1) over all N securities)/10*8 then 4 when c1>min(c1) over all N securities+(max(c1) over all N securities−min(c1) over all N securities)/10*8 and c1<=min(c1) over all N securities+(max (c1) over all N securities−min(c1) over all N securities)/10*9 then 4.5 when c1>min(c1) over all N securities+(max(c1) over all N securities−min (c1) over all N securities)/10*9 and c1<=max(c1) over all N securities then 5. Note that the above determines a scale value of 4, 4.5, or 5. The logic is the same for other scales values of 1, 1.5, 2, 2.5, 3, 3.5, etc. and is omitted for sake of brevity.

Figure 7C:
FIG. 7C is a table of an example computation of depth in a financial implementation of the example method of FIG. 6.

Returning to FIG. 6, at block 610, a time-weighted depth for the consolidated data is computed. A depth may be selected at an initial value, such as 10 basis points, and changed via block 612 until a set of time-weighted depths 614 are computed. Time-weighted depths may be computed for each of the sell side and the buy side. In this example, time-weighted depths 614 using depths of 10 basis points and 25 basis points are computed for each of the sell side and the buy side of the consolidated data. FIG. 7C shows an example of 10 basis points on the buy and sell sides for the example consolidated data. It is noted that price level is form of key and the ranges of basis points represent different ranges of keys.

A time-weighted depth may be computed as:

Step 1: sum (price*volume) at each price level until N basis points (e.g., 10 or 25) from the prevailing top of the book mid-price is reached;

Step 2: Take the natural logarithm of the result of Step 1;

Step 3: Multiply the result of Step 2 by an aggregate duration of the price depth of N basis points. This may be the portion of time that the price depth of N basis points has been present in the order book. For example, if consolidated data is captured once per minute over a period of 360 minutes (e.g., 9:45 AM to 3:45 PM), then the portion of time is some number of minutes relative to 360 minutes. If, for example, the price depth of N basis points existed in 65 sets of consolidated data, then the aggregate duration is $65/360$ or 0.1806;

Step 4: Calculate a z-score of the result of Step 3. The z-score may be computed relative to a larger group of financial instruments, so that it forms a comparative value with respect to the market as a whole. For example, z-score=(value of Step 3 for this security-average of the Step 3 values of 2000 comparable securities)/standard deviation of the Step 3 values of the 2000 comparable securities; and Step 5: Scale the result of Step 4 uniformly, such as to a scale of 1 to 5.

At block 616, the computed average spreads at the various amounts 606 and time-weighted depths at various depths 614 may be combined. If all such results are on a common scale (e.g., 1 to 5), then they may be combined by a weighted average, such as with equal weights.

Then, at block 618, a consolidated indicator may be outputted. The consolidated indicator may be the weighted average determined from block 616. The consolidated indicator may thus indicate liquidity of the financial instrument, where liquidity is representative of whether the instrument is available or in demand.

The method 600 may be repeated at intervals, periodically or regularly. Example intervals include 10 seconds, 30 seconds, 1 minute, 2 minutes, 5 minutes, 10 minutes, 1 hour, and 1 day.

Returning to FIG. 1, in financial examples, the data sources 102, 104, 106 may include trading systems and/or market data sources thereof. The client terminals 108 may be operated by market participants interested in buying and/or selling financial instruments. The consolidated indicator server 112 computes and provides the consolidated indicator 120 to the client terminals 108, so that the client terminals 108 may take automated trading actions with the data sources 102, 104, 106, take automated trading actions with other trading systems, take automated trading actions with smart order routers, and/or issue alerts to human operators.

The consolidated indicator 120 represents market-wide liquidity of a financial instrument, as computed from market data 130, 132, 134 obtained from the different data sources 102, 104, 106 using the techniques discussed herein.

In view of the above, it should be apparent that data may be consolidated and a consolidated indicator may be generated and outputted to inform client terminals as to availability or demand of an underlying service. Client terminals may then respond to the consolidated indicator by taking automated action or other action.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method comprising:
   establishing data connections to a plurality of different data sources via a wide-area computer network, wherein the plurality of different data sources serves a plurality of client terminals via the wide-area computer network;
   requesting respective data from each of the plurality of different data sources via the wide-area computer network, wherein the respective data includes key-value pairs that include numerical keys and numerical values, wherein each key represents a level of service associated with a data source and the plurality of client terminals, and the respective value represents availability or demand for the level of service;
   receiving the respective data from each of the plurality of different data sources via the wide-area computer network;
   consolidating the respective data into consolidated data by summing values for each key;
   determining a consolidated indicator for the consolidated data by computing an average key and an aggregate duration of keys of the consolidated data; and
   outputting the consolidated indicator for access to the plurality of client terminals via the wide-area computer network to allow the plurality of client terminals to use the consolidated indicator to configure respective data communications with the plurality of different data sources.

2. The method of claim 1, wherein determining the consolidated indicator for the consolidated data comprises computing the average key as weighted by the values.

3. The method of claim 2, further comprising determining the consolidated indicator from a spread between availability and demand by:
   computing, for key-value pairs that represent the availability of a service, an average of respective keys as weighed by respective values to obtain an average availability key;
   computing, for key-value pairs that represent the demand of the service, an average of respective keys as weighed by respective values to obtain an average demand key; and
   determining the spread as a difference between the average availability key and the average demand key.

4. The method of claim 3, further comprising:
   limiting an amount of key-value pairs that represent the availability of the service; and
   limiting by the same amount, key-value pairs that represent the demand of the service.

5. The method of claim 1, further comprising computing the aggregate duration as a portion of time during which a range of keys is present in the consolidated data.

6. The method of claim 5, further comprising:
   computing different aggregate durations for different ranges of keys; and
   combining the different aggregate durations to obtain the consolidated indicator.

7. The method of claim 1, wherein determining the consolidated indicator for the consolidated data includes:
   computing:
     the average key as weighted by the values; and
     the aggregate duration as a portion of time during which a range of keys is present in the consolidated data; and
   combining the average and the aggregate duration to obtain the consolidated indicator.

8. The method of claim 7, wherein combining the average key and the aggregate duration comprises normalizing and averaging the average key and the aggregate duration.

9. The method of claim 1, wherein each key is a price level of a financial instrument and each value is a volume of the financial instrument to be traded at a respective price level.

10. A device comprising:
a network interface configured to provide data connections to a plurality of different data sources via a wide-area computer network, wherein the plurality of different data sources serves a plurality of client terminals via the wide-area computer network;
a processor connected to the network interface, the processor configured to:
request respective data from each of the plurality of different data sources via the wide-area computer network, wherein the respective data includes key-value pairs that include numerical keys and numerical values, wherein each key represents a level of service associated with a data source and the plurality of client terminals, and the respective value represents availability or demand for the level of service;
receive the respective data from each of the plurality of different data sources via the wide-area computer network;
consolidate the respective data into consolidated data by summing values for each key;
determine a consolidated indicator for the consolidated data by computing an average key and an aggregate duration of keys of the consolidated data; and
output the consolidated indicator for access to the plurality of client terminals via the wide-area computer network to allow the plurality of client terminals to use the consolidated indicator to configure respective data communications with the plurality of different data sources.

11. The device of claim 10, wherein the processor is configured to determine the consolidated indicator for the consolidated data by computing the average key as weighted by the values.

12. The device of claim 11, wherein the processor is configured to determine the consolidated indicator from a spread between availability and demand by:
computing, for key-value pairs that represent the availability of a service, an average of respective keys as weighed by respective values to obtain an average availability key;
computing, for key-value pairs that represent the demand of the service, an average of respective keys as weighed by respective values to obtain an average demand key; and
determining the spread as a difference between the average availability key and the average demand key.

13. The device of claim 12, wherein the processor is configured to:
limit an amount of key-value pairs that represent the availability of the service; and
limit, by the same amount, key-value pairs that represent the demand of the service.

14. The device of claim 10, wherein the processor is configured to compute the aggregate duration as a portion of time during which a range of keys is present in the consolidated data.

15. The device of claim 14, wherein the processor is configured to:
compute different aggregate durations for different ranges of keys; and
combine the different aggregate durations to obtain the consolidated indicator.

16. The device of claim 10, wherein the processor is configured to determine the consolidated indicator for the consolidated data by:
computing:
the average key as weighted by the values; and
the aggregate duration as a portion of time during which a range of keys is present in the consolidated data; and
combining the average and the aggregate duration to obtain the consolidated indicator.

17. The device of claim 16, wherein the processor is configured to combine the average key and the aggregate duration by normalizing and averaging the average key and the aggregate duration.

18. The device of claim 10, wherein each key is a price level of a financial instrument and each value is a volume of the financial instrument to be traded at a respective price level.

* * * * *